Dec. 14, 1926.
N. MARCALUS
OIL SYSTEM
Filed Dec. 13, 1924      3 Sheets-Sheet 1
1,611,053
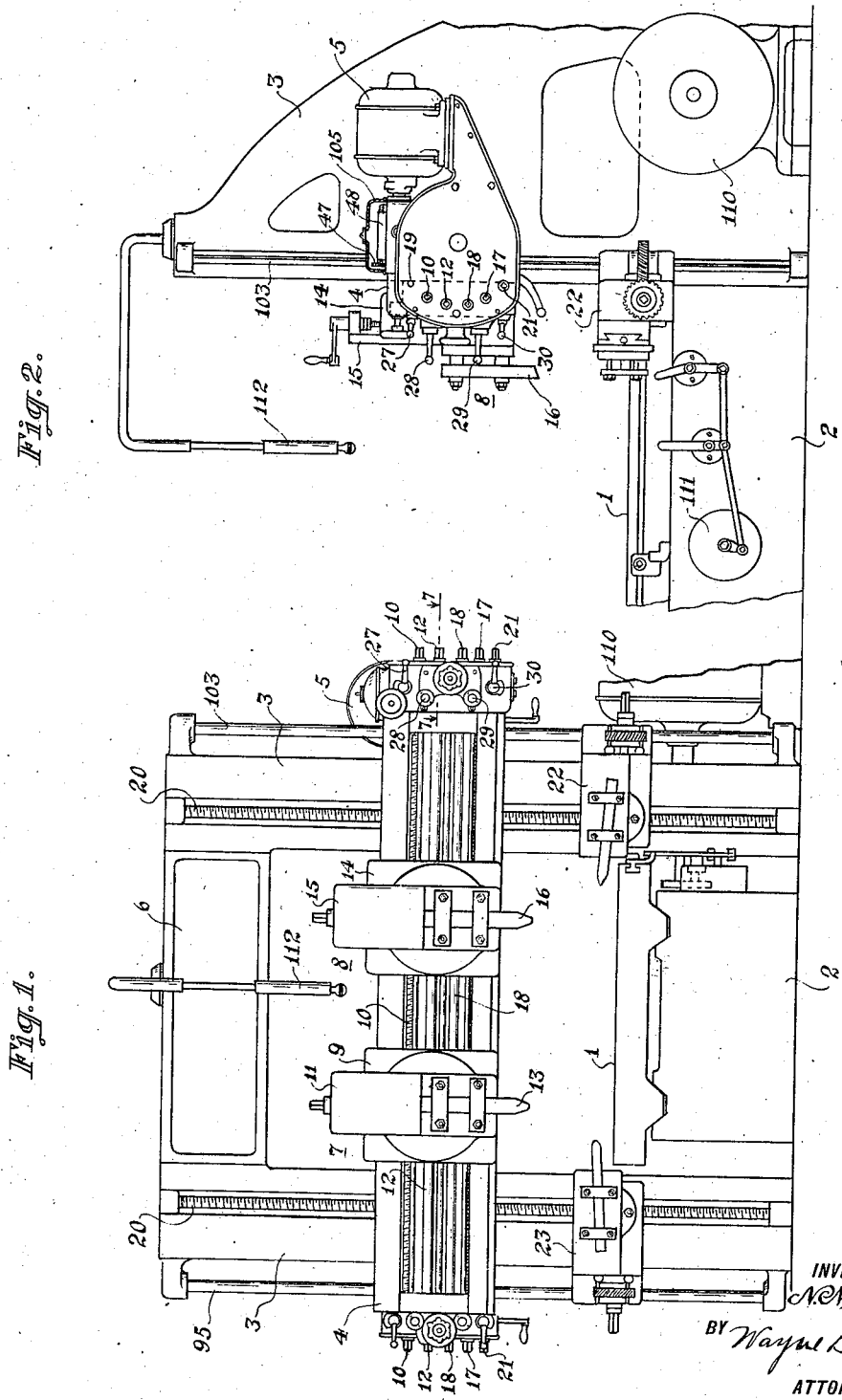

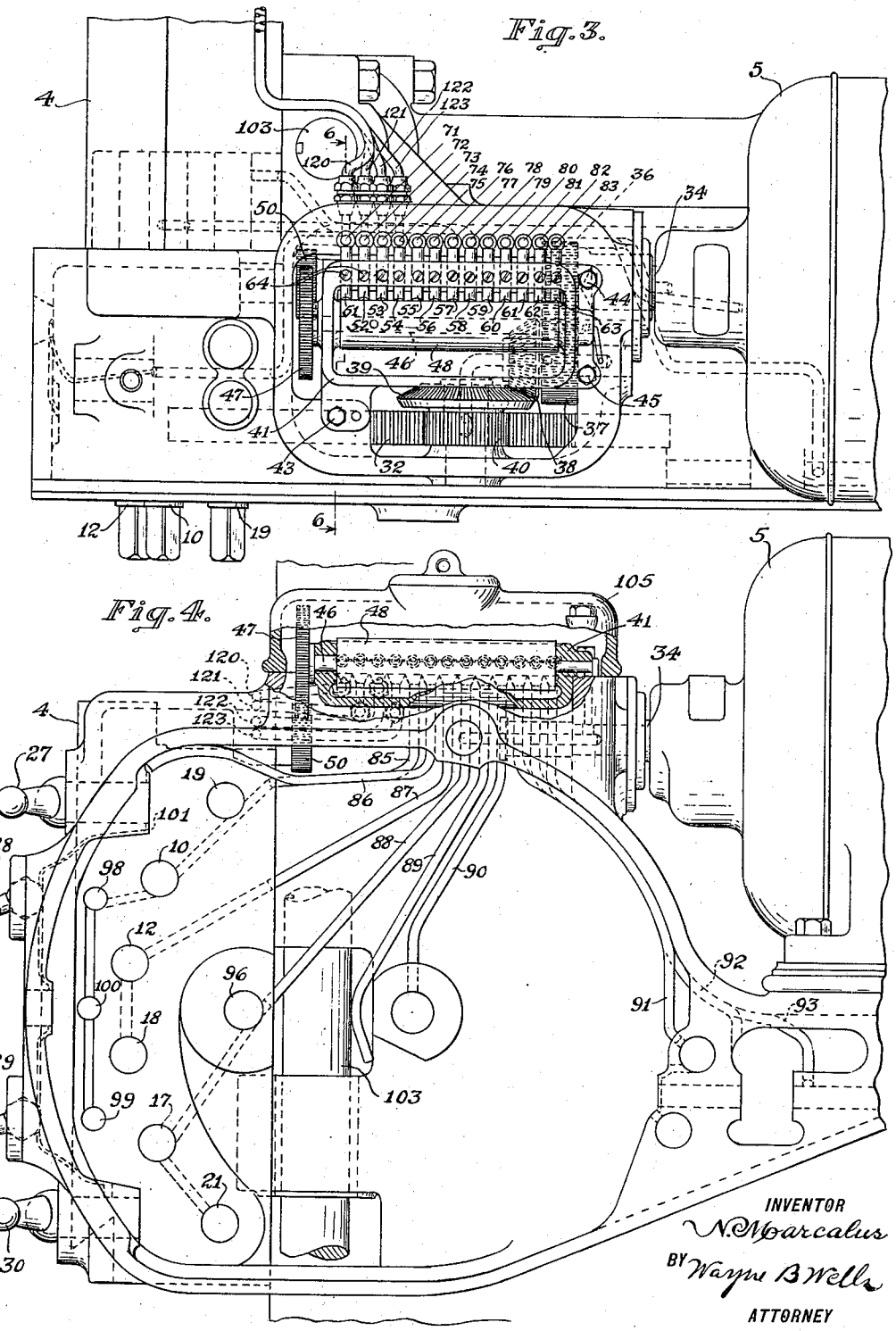

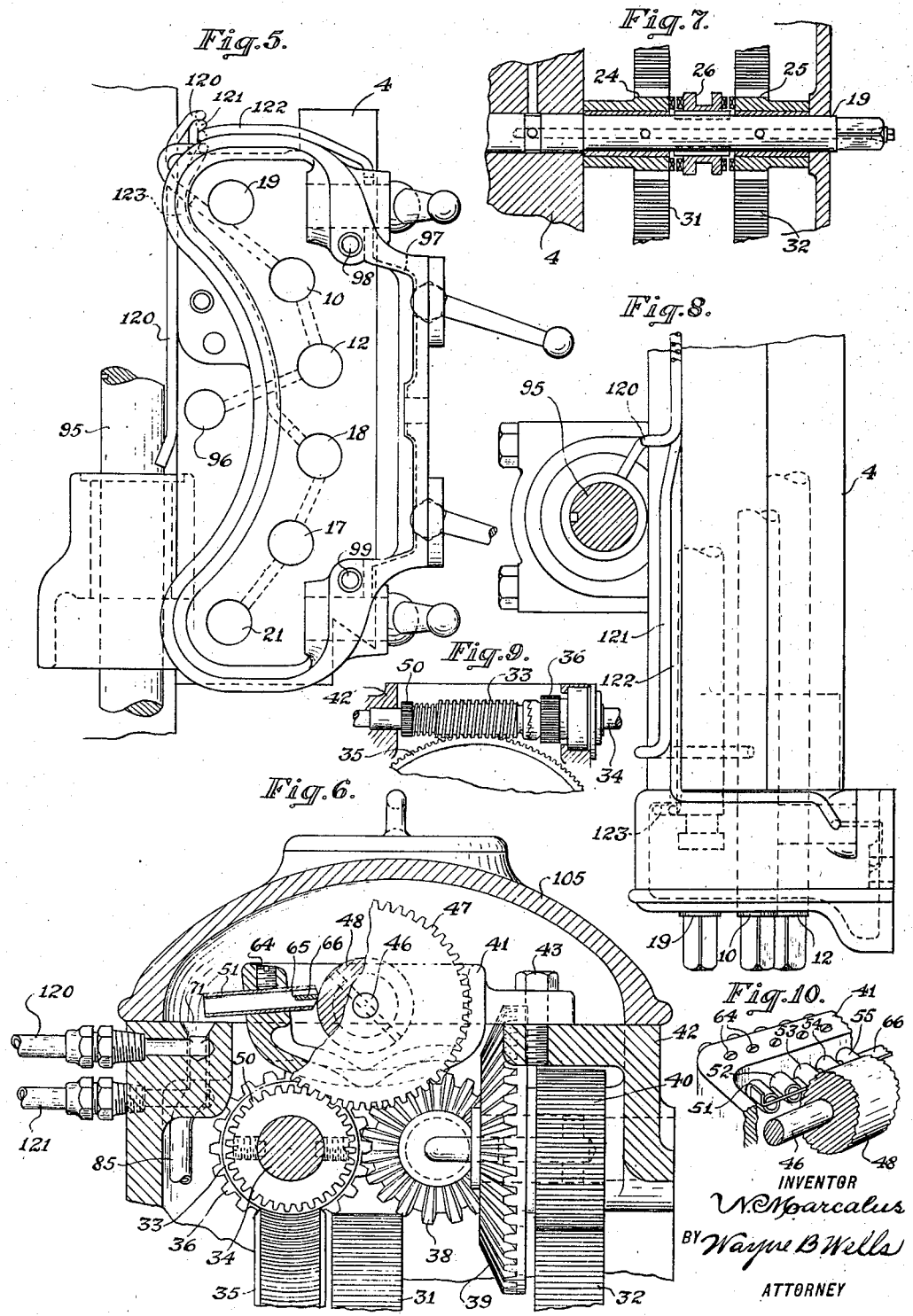

Patented Dec. 14, 1926.

1,611,053

UNITED STATES PATENT OFFICE.

NICHOLAS MARCALUS, OF PLAINFIELD, NEW JERSEY, ASSIGNOR TO NILES-BEMENT-POND COMPANY, OF NEW YORK, N. Y., A CORPORATION OF NEW JERSEY.

OIL SYSTEM.

Application filed December 13, 1924. Serial No. 755,754.

My invention relates to oil systems for machine tools and particularly to oil systems for planers.

One object of my invention is to provide an oil system for a number of bearings that shall supply oil to the bearings directly in accordance with the rotation of the shafts in such bearings.

Another object of my invention is to provide an oil system for the feed mechanism of a planer that shall supply oil to the various bearings for the feed shafts directly in accordance with the feeding and the traverse movements of the mechanism.

Another object of my invention is to provide an oil system for a machine tool that shall rotate a cylinder in a bath of oil in accordance with certain movements of the machine and that shall wipe the oil from the cylinder for supplying lubricant to the various bearings of the machine.

A further object of my invention is to provide an oil system for a planer feed mechanism, which is mounted on the cross rail, that shall supply each bearing on the cross rail with oil exactly in accordance with the feeding and the traverse movements of the feed mechanism.

In operating many machine tools, and particularly in operating planers, it is essential that the various bearings in the feed mechanism be oiled at frequent intervals. The feed mechanism of a planer has a number of bearings on the cross rail and the cross rail is very often in a position rendering it difficult to supply oil to the bearings. In an oil system constructed in accordance with my invention, the various bearings of the feed mechanism on the cross rail are automatically supplied with oil directly in accordance with the movement of the feed mechanism no matter whether the mechanism is effecting a feeding or a traverse operation.

In an oiling system constructed in accordance with my invention a reservoir of oil is provided on the cross rail and a rotatable cylinder is mounted in the reservoir. A portion only of the surface of the cylinder extends into the bath of oil. The cylinder is directly connected by suitable gearing to the feed mechanism of the planer in order to be rotated directly in accordance with the feeding and the traverse movements. Thus the cylinder is continuously rotated during the traverse movement. A wiper, which preferably comprises a metallic plate, engages the surface of the cylinder and scrapes the oil from such cylinder into a number of tubes. The tubes lead to the various bearings on the cross rail.

The oiling system disclosed in this application is particularly adapted for the planer which is disclosed and claimed in my companion application, Serial No. 756,054, filed December 15, 1924. However, it is to be understood that my oiling system is not restricted for use on the planer disclosed in my companion application and moreover is of utility on many other machines and machine tools.

In the accompanying drawings:

Figure 1 is an end elevational view of a planer having an oil system constructed in accordance with my invention.

Fig. 2 is a front elevational view of the planer shown in Fig. 1.

Fig. 3 is a plan view of a portion of the cross rail shown in Fig. 1 and with the cover of the oil reservoir removed.

Fig. 4 is an end view of the mechanism shown in Fig. 3.

Fig. 5 is an end view of the rail when looking from the left of Fig. 1.

Fig. 6 is a sectional view along the line 6—6 of Fig. 3.

Fig. 7 is a sectional view along the line 7—7 of Fig. 1.

Fig. 8 is a rear view of a portion of the cross rail.

Fig. 9 is a view of the armature shaft and worm member.

Fig. 10 is a view showing the mounting of the wiper member in the conducting tubes.

Referring to the drawings, and particularly to Figs. 1 and 2, a planer is illustrated comprising a reciprocating table 1 which is mounted on a bed 2. Two uprights 3 are provided for supporting a cross rail 4. The cross rail 4 carries a feed motor 5 which effects not only all the traverse and feed movements of the cutting tools on the rail, but also effects movement of the rail on the uprights 3 and controls the movement of the side heads. A full description of such feeding movements is set forth in my companion application Serial No. 756,054. In many planers, the feed motor 5 is mounted upon an arch 6 between the uprights 3. However, it is much preferable to support the motor directly upon the cross rail.

The table 1 is shown operated by a reversing motor 110. The reversing motor, in the usual manner, is controlled by a pilot switch 111 in accordance with the movement of the table 1. The main motor 110 and the feed motor 5 may be controlled at will by means of a suitable pendant switch 112 if so desired.

Two tool heads 7 and 8 are mounted upon the cross rail 4. The tool head 7 comprises a tool-head saddle 9 which is operated along the cross rail by means of a screw shaft 10. A tool slide 11, which is mounted on the saddle 9, is operated in a vertical direction by means of a spline shaft 12. The usual clapper box carrying the cutting tool 13 is mounted on the slide 11. The tool head 8 comprises a tool-head saddle 14 and a tool slide 15 for supporting a cutting tool 16. The tool slide is moved along the cross rail 4 by means of a screw shaft 17 and the slide 15 is moved in a vertical direction by means of a spline shaft 18. The cross rail 4 also carries a shaft 19 for controlling the raising and lowering of the cross rail by means of the screw shafts 20 and a spline shaft 21 for controlling the operation of two side heads 22 and 23.

Each of the shafts 10, 12, 17, 18, 19 and 21 carry two pinions 24 and 25, as shown in Fig. 7 of the drawings. The pinions are loosely mounted on the shafts and are adapted to be connected thereto by means of a clutch member 26 which is disposed between them. A lever 27 serves to control the clutch member on the shaft 19, a lever 28 serves to control the clutch members on the shafts 10 and 12, a lever 29 serves to control the clutch members on the shafts 17 and 18, and a lever 30 serves to control the clutch member on the shaft 21. All the pinions 24 and 25 respectively mesh with two feed gear wheels 31 and 32. Such feed gear wheels 31 and 32 are geared together, in the manner disclosed in the companion application above referred to, in order to rotate in reverse directions. The gear wheels 31 and 32 are operated by means of the motor 5 and are rotated at different speeds according to the direction of rotation of the motor.

Two gearing connections are provided between the gear wheels 31 and 32 and the motor 5 in order to rotate the gear wheels at one speed when the motor is rotated in one direction and to rotate the gear wheels at a different speed when the motor is rotated in a reverse direction. One connection to the gear wheels 31 and 32 comprises a worm member 33 which is splined to the motor shaft 34. The worm member 33 meshes with a worm wheel 35 which is mounted concentrically with the gear wheels 31 and 32. A one way clutch (not illustrated upon the drawings) is provided between the worm wheel 35 and the gear wheel 31 in order to effect rotation of the gear wheels 31 and 32 only when the worm wheel 35 is rotated in a predetermined direction.

A pinion 36, which is rotatably mounted on the armature shaft 34, is adapted to be connected to the worm member 33 when the motor 5 is rotated in such direction as not to connect the worm wheel 35 to the gear wheels 31 and 32. Thus, the one way clutch between the pinion 36 and the worm member 33 is operative in one direction of rotation of the motor 5 and the one way clutch between the worm wheel 35 and the gear wheel 31 is operative in the other direction of rotation of the motor. The pinion 36 meshes with a pinion 37. The pinion 37 is provided with bevel geared teeth 38 which mesh with the teeth on a bevel gear wheel 39. The bevel gear wheel 39 is connected to a pinion 40 which directly meshes with the teeth on the feed gear wheel 32. A further description of the feed mechanism is deemed unnecessary, inasmuch as a full description of such feed mechanism is given in my companion application. Moreover, my invention is related particularly to the oil system for the feed mechanism and accordingly only enough of the feed mechanism has been described to show the relation of the oil system to it.

A reservoir 41 containing oil is supported on a bracket 42 which carries the feed mechanism shown to the right of the rail, when viewed in Fig. 1 of the drawings. In Figs. 3 and 6 of the drawings, the reservoir 41 is shown secured to the bracket 42 by means of bolts 43, 44 and 45. A shaft 46, which is rotatably supported in the reservoir, carries a gear wheel 47 and a cylinder 48. The cylinder 48 is disposed within the reservoir so that a portion of the surface thereof engages the oil bath. The gear wheel 47 is mounted on the shaft 46 outside the reservoir 41 and meshes with a pinion 50 which is keyed to the armature shaft 34. Accordingly, the shaft 46 and the cylinder 48 are rotated whenever any movement of the feed motor 5 is effected.

In Figs. 3, 4 and 6 of the drawings, thirteen small tubes numbered 51 to 63, inclusive, project through the side of the reservoir 41. Such tubes are held in position adjacent the cylinder 48 by means of set screws 64. A slot 65 is formed in each tube adjacent the cylinder 48 and a scraper or wiper member 66 is positioned in such slots 65 so as to engage the surface of the cylinder 48. Thus, upon rotation of the cylinder 48 in either a clockwise or a counter-clockwise direction, the scraper or wiper 66 removes the oil adhering to the surface of the cylinder and supplies it to the tubes 51 to 63, inclusive. The opposite ends of the tubes 51 to 63, inclusive, are disposed above holes 71 to 83, inclusive, which are formed in the bracket 42. The holes 71 to 83, inclusive, are connected to pipes or tubes 85 to 93, inclusive and tubes 120, 121, 122 and 123.

The first four tubes 120, 121, 122 and 123, extend along the rear of the rail for oiling the feed mechanism at the rear of the planer. The tube 120 leads to the shaft 95 which operates the side head at the rear of the planer. The tube 121 supplies oil to the bearings at the rear of the planer for the shafts 19, 10 and 12. Such tube 121 also supplies oil for a shaft 96 which controls the clamping of the cross rail on the uprights. Tube 122 supplies oil to the levers located at the rear of the planer for controlling the operation of the rail, the operation of the tool heads, and the operation of the side heads. It will be noted, in Fig. 5 of the drawings, that a channel 97 is cut in the casting supporting the levers for supplying oil from the tube 122 to the various bearings for the four levers which control the shafts 19, 10, 12, 18, 17 and 21. Two control shafts 98 and 99, which extend across the cross rail and which are shown in Fig. 5 of the drawings, are controlled by levers at the rear of the planer which are similar to the levers 28 and 29 which are mounted at the front of the planer. The tube 123 supplies oil to the bearings at the rear of the planer for the shafts 18, 17 and 21.

Referring to Figs. 3 and 4 of the drawings, the tube 85 is shown supplying oil to the bearings at the front of the planer for the shafts 19 and 10. The tube 85 also supplies oil to the bearings for the control shafts 98 and 99 and to a short shaft 100, which is a part of the mechanism for changing the rate of feed. The tube 86 supplies oil to the bearings for the levers 27, 28, 29 and 30. The tube is shown connected to a channel 101 which is cut in the casting. The tube 87 supplies oil to the bearings at the front of the machine for the shafts 12 and 18. The tube 88 supplies oil at the front of the planer for the shafts 17 and 21 and to the bearings for the clamping shaft 96. The tube 89 supplies oil to the shaft 103 which operates the side head 22 at the front of the planer. The tube 90 supplies oil to the bearings of the gear wheels 31 and 32 and the worm wheel 35. The tubes 91, 92 and 93 supply oil to the feed mechanism which serves to vary the rate of feeding and traversing movements.

A removable cover 105 is provided for enclosing the feed gears at the front of the planer and the oil reservoir. It will be noted the reservoir 41 is positioned above all the bearings and accordingly the oil will flow by gravity to each bearing. Attention is also called to the fact that the cylinder 48, which supplies oil to the various tubes, is always operated directly in accordance with the movement of the feed motor 5 and accordingly oil will be supplied to each bearing of the feed mechanism on the planer in accordance with the rate of the motor operation and accordingly in accordance with the traverse or feeding movement. Although only 13 tubes have been shown in this oil system it is to be understood that any desired number of tubes may be automatically supplied with oil in the manner disclosed.

Modifications in the system and in the arrangement and location of parts may be made within the spirit and scope of my invention and such modifications are intended to be covered by the appended claims.

What I claim is:

1. In an oil system for the feed mechanism of a planer, the combination with a reservoir containing oil and located on the cross rail, a rotatable member having a portion of the surface thereof extending into said oil, and a plurality of tubes each having an opening adjacent to said rotatable member, of means for supplying oil from said rotatable member to the tubes in accordance with the rotation of said member, and means for rotating the member in accordance with the operation of the feed mechanism.

2. In an oil system for the feed mechanism of a planer, the combination with a reservoir of oil mounted on the cross rail, a plurality of tubes for supplying oil from the reservoir to the bearings of the feed mechanism on the cross rail, a rotatable cylinder having a portion thereof extending into the oil in the reservoir, and gearing between said cylinder and the feed mechanism for continuously rotating the cylinder during traversing and for rotating the cylinder according to the feeding movement, of a wiper member for engaging said cylinder to supply oil to said tubes in accordance with the operation of the feed mechanism.

3. In an oil system for the feed mechanism of a planer, the combination with a plurality of bearings for a number of shafts on the cross rail of the planer, and a plurality of tubes for conducting oil to the bearings, of a reservoir of oil mounted on the cross rail, a rotatable cylinder mounted in said reservoir and having a portion thereof extending into the oil, means for rotating said cylinder in accordance with the rotation of said shafts, and means for supplying oil from the cylinder to the tubes in accordance with the rotation of the cylinder.

In testimony whereof, I hereto affix my signature.

NICHOLAS MARCALUS.